United States Patent Office 2,892,829
Patented June 30, 1959

2,892,829

NEW MONOAZO DYESTUFFS

William Elliot Stephen, Manchester, England, assignor to Imperial Chemical Industries Limited, London, England, a corporation of Great Britain No Drawing. Application November 25, 1955
Serial No. 549,178

Claims priority, application Great Britain
November 29, 1954

3 Claims. (Cl. 260—153)

This invention relates to new monoazo dyestuffs and more particularly it relates to new monoazo dyestuffs which are valuable for the production of fast red colourations on cellulosic materials.

In United Kingdom specification No. 209,723 there is described the manufacture of azo dyestuffs by synthesising dyestuffs containing one or more cyanuric nuclei, (1) by uniting together or with other suitable components by reactions which lead to the formation of azo dyestuffs, intermediate products containing one or more cyanuric nuclei, or (2) by uniting azo dyestuffs containing appropriate groupings, either to each other or to other complexes, radicals or suitable residues by reaction with the halogen of cyanuric halides.

In the said specification there are disclosed monoazo dyestuffs, wherein there are attached to the triazine ring two chlorine atoms and which are obtained by reaction of one molecular proportion of an aminonaphthol sulphonic acid with one molecular proportion of cyanuric chloride and subsequently treating the product with a diazo compound obtained by diazotising for example aniline, p-tolidine or p-aminoacetanilide. There are also disclosed monoazo dyestuffs, wherein there are attached to the triazine ring one chlorine atom and one anilino group, and which are obtained by reaction of one molecular proportion of an aminonaphthol sulphonic acid and one molecular proportion of aniline with one molecular proportion of cyanuric chloride and subsequently treating the product with a diazo compound obtained by diazotising a substitution product of aniline having a negative substituent for example Cl, $CO_2H$ or $SO_3H$.

There are no compounds disclosed in the said specification, however, which contain attached to the triazine ring, in addition to two atoms of chlorine, the residue of an aminonaphthol sulphonic acid coupling component to which is attached the residue of a diazo component of the benzene series which contains sulphonic acid groups.

I have found that certain monoazo dyestuffs of the kind containing two chlorine atoms attached to the triazine ring and also an aminonaphthol sulphonic acid radical containing an ortho-sulphophenylazo substituent, which dyestuffs in their free acid form are represented by the formula given below, have superior tinctorial value and superior fastness to wet treatments, as compared with monoazo dyestuffs of comparable shade specifically described in United Kingdom specification No. 209,723 containing only 1 chlorine atom attached to the triazine ring and superior fastness to light as compared with monoazo dyestuffs of comparable shade specifically described in United Kingdom specification No. 209,723 which contain two chlorine atoms attached to the triazine ring but which do not contain the ortho-sulphophenylazo substituent, when the dyestuffs are applied to cellulosic textile materials by a process which comprises impregnating the said textile materials with the dyestuff in aqueous solution and subsequently subjecting the textile material to the action of an acid-binding agent in aqueous medium for a short period of time of the order only of a few minutes, advantageously in the presence of an electrolyte such as sodium chloride or sodium sulphate.

According to my invention I provide new monoazo dyestuffs which in the form of their free acids are of the formula

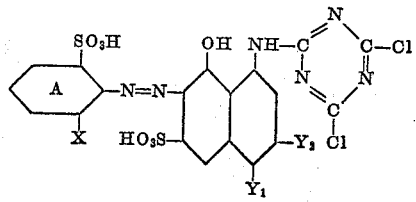

wherein the benzene nucleus A optionally bears further substituents other than hydroxyl and amino groups, X stands for a hydrogen atom or a substituent other than halogen, and wherein $Y_1$ and $Y_2$ are such that one of $Y_1$ and $Y_2$ stands for a hydrogen atom and the other stands for a hydrogen atom or the group —$SO_3H$.

According to my invention I also provide a process for the manufacture of the said new monoazo dyestuffs which comprises diazotising a primary aromatic amine of the formula:

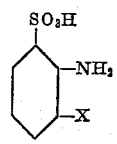

wherein X has the meaning stated above and the benzene nucleus may optionally bear further substituents other than hydroxy and amino groups, and coupling the diazo compound thus formed with a coupling component of the formula:

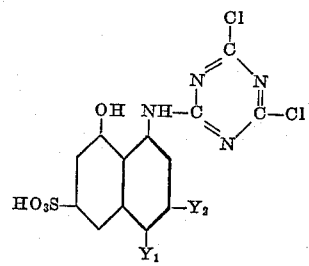

wherein $Y_1$ and $Y_2$ have the meaning stated above.

As examples of primary aromatic amines which may be used in the process of my invention there may be mentioned aniline-2-sulphonic acid, aniline-2:5-disulphonic acid, 3-aminobenzotrifluoride-4-sulphonic acid, 2:4-dimethylaniline-6-sulphonic acid, 4-chloro-5-methylaniline-2-sulphonic acid, 5-chloro-4-methylaniline-2-sulphonic acid, 3-acetylaminoaniline-6-sulphonic acid, 4-acetylaminoanaline-2-sulphonic acid, 4-chloroaniline-2-sulphonic acid, 3:4-dichloroaniline-6-sulphonic acid, 4-methylaniline-2-sulphonic acid, 3-methylaniline-6-sulphonic acid, 2:4-dimethoxyaniline-6-sulphonic acid, 4-methoxyaniline-2-sulphonic acid and 5-methoxyaniline-2-sulphonic acid.

As coupling components for use in the process of my invention there may be used for example the primary condensation products obtained by reaction of 1-amino-8-naphthol-6-sulphonic acid or 1-amino-8-naphthol-3:6-disulphonic acid, or 1-amino-8-naphthol-4:6-disulphonic acid, with one molecular proportion of cyanuric chloride in aqueous medium.

According to a further feature of my invention I provide an alternative process for the manufacture of the said new monoazo dyestuffs which comprises reacting a monoazo compound which in the form of its free acid is of the formula

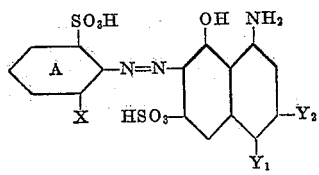

wherein X, Y₁ and Y₂ have the meaning stated above and the benzene nucleus A may optionally bear further substituents other than hydroxyl and amino groups, with one molecular proportion of cyanuric chloride. The monoazo compound may conveniently be in the form of its alkali metal salt, for example its sodium salt.

The monoazo compounds used as starting materials for reaction with cynauric chloride by the alternative process of the invention may be obtained by coupling, in alkaline medium, the diazo compound obtained by diazotising a primary aromatic amine, as defined above, with an aminonaphthol sulphonic acid of the formula

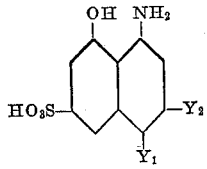

wherein the Y₁ and Y₂ have the meanings stated above, or, alternatively, when the said diazo compound does not contain an acylamino group, by coupling the said diazo compound with the N-acetyl derivative of the aminonaphthol sulphonic acid and subsequently removing the acetyl group by hydrolysis with for example caustic soda.

In the process of my invention, the diazotising of the primary aromatic amine and the coupling of the diazo compound thus produced with the coupling component are preferably carried out at a temperature below 5° C., conveniently at a temperature between 0° and 5° C. In the process of my invention wherein there is used a coupling component containing the cynauric nucleus it is advantageous to use for the coupling reaction the said coupling component prepared in situ at temperatures between 0° and 5° C. by methods known from the literature and to carry out the couplings at similar temperatures and at as low a pH as is possible for efficient coupling, in order that side reactions, for example hydrolysis of the chlorine atoms remaining attached to the triazine ring, are minimised.

In the manufacture of the new dyestuffs of the invention by the alternative process, namely by reacting equimolecular proportions of a monoazo compound of the formula stated and cyanuric chloride, the reaction is preferably carried out in aqueous medium at temperatures between 0° and 5° C.

Similarly, in order to avoid such side-reactions during manufacture and storage, it is generally preferable to isolate the new dyestuffs from the media in which they have been formed at a pH from 6.4 to 7.8 and to dry the resultant dyestuff pastes at relatively low temperatures, for example between 20° and 40° C., preferably in the presence of buffering agents suitable for maintaining a pH value of about 6.5. Examples of such buffering agents are mixtures of disodium hydrogen phosphate and sodium dihydrogen phosphate or of disodium hydrogen phosphate and potassium dihydrogen phosphate.

The new dyestuffs of this invention in the form of their alkali metal salts are readily soluble in water and are especially suitable for the production of level and fast red colourations on cellulosic textile materials by continuous dyeing techniques, for example by a process which comprises impregnating the said textile materials in aqueous medium with the dyestuff and thereafter subjecting the textile materials, optionally after drying, to the action of an acid binding agent for example caustic soda, in aqueous medium advantageously containing an electrolyte such as sodium chloride or sodium sulphate, for a short period of time, commonly of the order only of a few minutes, at temperatures lying between atmospheric temperature and the temperature of the boiling solution and also by printing methods, for example by a process which comprises applying to the said textile materials a printing paste containing the dyestuff and a substance which on heating or steaming liberates an acid binding agent, for example sodium bicarbonate, and subsequently subjecting the textile materials to the action of heat or steam. The colourations thus produced possess a high degree of fastness to light and to wet treatments, especially to repeated washing.

The invention is illustrated but not limited by the following examples in which the parts are by weight.

Example 1

A solution of 18.5 parts of cynauric chloride in 100 parts of acetone is poured into a stirred mixture of 300 parts of water and 300 parts of crushed ice, and 2 parts of 2 N hydrochloric acid are added. To the suspension of cyanuric chloride thus obtained there is added during 1 hour a solution of 36.3 parts of the disodium salt of 1-amino-8-naphthol-3:6 disulphonic acid, in 160 parts of water, which has been made faintly alkaline to Brilliant Yellow by the addition of aqueous sodium carbonate solution, the temperature of the mixture during and subsequent to the addition being kept below 5° C. The reaction mixture is stirred until no unchanged 1-amino-8-naphthol-3:6 disulphonic acid remains in the resulting solution.

A suspension of the diazo compound from 16.45 parts of aniline-2-sulphonic acid, obtained by diazotising a mixture of the aniline-2-sulphonic acid in 200 parts of water and 22 parts of hydrochloric acid (density 1.18) at a temperature between 0° and 2° C. with 6.55 parts of sodium nitrite is added to the mixture during 5 minutes while the temperature of the mixture is maintained between 0° and 5° C. 50 parts of sodium acetate crystals are then added during 10 minutes to the mixture, which is then stirred for about 20 hours at a temperature between 0° and 4° C. after which time sufficient anhydrous sodium carbonate is added to render the aqueous medium slightly alkaline to litmus. Sufficient sodium chloride to give a concentration of 200 grams per litre is added and the mixture is stirred for 30 minutes and then filtered. The solid on the filter is washed with 20% aqueous sodium chloride solution and dried at 20 to 45° C. The product forms a bluish-red powder which dissolves in water to give a yellowish-red solution and in concentrated sulphuric acid to give a reddish-violet solution. This dyestuff has, in the form of its free acid, the formula:

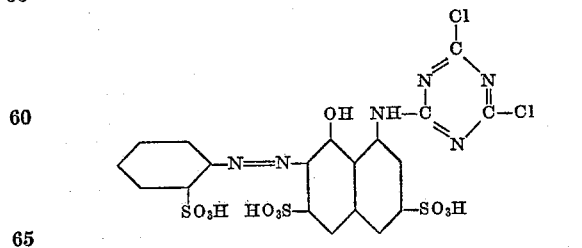

When applied to cellulosic fibres, for example, cotton, by the aforesaid method of impregnation and subsequent treatment with an acid binding agent, yellowish-red colourations are obtained possessing very good fastness to repeated washing and good fastness to light.

Example 2

A solution of 18.5 parts of cyanuric chloride in 100 parts of acetone is poured into a stirred mixture of 300 parts of water and 300 parts of crushed ice. To the suspension of cyanuric chloride thus obtained there is added at a temperature below 4° C. during 1 hour a solution in 700 parts of water of 59.7 parts of the trisodium salt of the aminoazo compound, obtained by coupling diazotised 2:4-dimethylaniline-6-sulphonic acid with 1-acetyl-amino-8-naphthol-3:6-disulphonic acid in alkaline medium and hydrolysing the product with caustic soda. The mixture is stirred for one hour at a temperature below 4° C. and then 2 N aqueous sodium carbonate solution is added gradually during a further hour at such a rate as to maintain the mixture slightly acid to litmus. The mixture is then made slightly alkaline to litmus by the addition of more 2 N aqueous sodium carbonate solution. Sufficient sodium chloride to give a concentration of 200 grams per litre is added and the mixture is stirred for 30 minutes and then filtered. The solid on the filter is then washed with 20% aqueous sodium chloride solution and dried at a temperature between 20 and 45° C. The product forms a bluish-red powder which dissolves in water to give a red solution and in concentrated sulphuric acid to give a red-violet solution.

Example 3

An alternative method for the preparation of the dyestuff of Example 1 is as follows:

A solution of 18.5 parts of cyanuric chloride in 100 parts of acetone is poured into a stirred mixture of 300 parts of water and 300 parts of crushed ice. During 40 minutes there is added to the suspension so formed a solution of 56.9 parts of the trisodium salt of the aminoazo compound formed by coupling orthanilic acid with 1-acetylamino-8-naphthol-3:6-disulphonic acid in the presence of sodium carbonate and hydrolysing the product in aqueous solution by means of caustic soda. The mixture is stirred at a temperature between 0° and 5° C. for 30 minutes and then sodium carbonate solution is added to it gradually until the solution formed reacts alkaline to litmus paper. Sufficient salt to give a concentration of 200 grams per litre is then added and then an aqueous solution containing 7 parts of anhydrous disodium hydrogen phosphate and 12.5 parts of anhydrous potassium dihydrogen phosphate is added and the mixture is stirred for 2 hours and then filtered. The solid is mixed intimately with 4 parts of anhydrous disodium hydrogen phosphate and 7.2 parts of anhydrous potassium dihydrogen phosphate and dried at 40° C.

Example 4

This example describes an alternative method for the manufacture of the dyestuff described in Example 1. The procedure of Example 1 is carried out up to and including the addition of the suspension of the diazo compound of aniline-2-sulphonic acid to the solution containing the N-dichlorocyanuryl-1-amino-8-naphthol-3:6-disulphonic acid. Then there is gradually added to the stirred mixture, while keeping the temperature between 0° and 4° C., sufficient soda ash to render the mixture only slightly acid to Congo Red paper. Sufficient sodium chloride is then added to give a concentration of 200 grams per litre and the mixture is stirred for 30 minutes, after which time the gradual addition of soda ash is resumed until the pH of the mixture is between 6 and 7 as indicated by Universal Indicator paper, and afterwards in sufficient quantity as required to maintain a pH of 6–7 for 1 hour. At the end of this period more soda ash is added to make the mixture alkaline to glazed red litmus paper and maintain it so until all the diazo component has reacted. A solution of 7 parts of anhydrous disodium hydrogen phosphate and 12.5 parts of anhydrous potassium dihydrogen phosphate in 100 parts of water is then added and the mixture is stirred for a further 30 minutes while keeping the temperature at 0° to 4° C., and then filtered. The solid is washed with a 20% aqueous solution of sodium chloride, mixed with 4 parts of anhydrous disodium hydrogen phosphate and 7.2 parts of anhydrous potassium dihydrogen phosphate, and then dried at 20–45° C. In the following table are listed derivatives of aniline-2-sulphonic acid which in equivalent amount can be substituted for it as diazo components in the method of the above example. Also listed in the table are the shades of dyeings obtained on cotton when the corresponding products are applied from aqueous solutions by padding and after-treating, optionally after drying, the padded material with brine solution containing caustic soda at varying temperatures. In all cases these dyeings show very good fastness to severe washing and to soda boiling.

| Diazo component coupled with N-dichlorocyanuryl-1-amino-8-naphthol-3:6-disulphonic acid | Shade of dyeings on cotton |
|---|---|
| 4-chloro-5-methyl-2-aminobenzene-sulphonic acid | Red. |
| 4-toluidine-3-sulphonic acid | Bluish red. |
| 5-chloro-4-methyl-2-aminobenzene-sulphonic acid | Do. |
| 4-chloroaniline-2-sulphonic acid | Red. |
| aniline-2:5-disulphonic acid | Very yellowish red. |
| 3-aminobenzotrifluoride-4-sulphonic acid | Do. |
| 3:4-dichloroaniline-6-sulphonic acid | Bluish red. |
| 3-aminoanisole-4-sulphonic acid | Red. |

Example 4

A solution of 18.5 parts of cyanuric chloride in 100 parts of acetone is poured into a stirred mixture of 300 parts of water and 300 parts of crushed ice and 2 parts of 2 N hydrochloric acid are added. There is then added to the suspension of cyanuric chloride during 50 minutes, a solution of 36.3 parts of the disodium salt of 1-amino-8-naphthol-4:6-disulphonic acid in 250 parts of water which has been made faintly alkaline to Brilliant Yellow by the addition of sodium carbonate solution, the temperature of the mixture during and subsequent to the additions being kept below 5° C. The reaction mixture is stirred until no unchanged 1-amino-8-naphthol-4:6-disulphonic acid remains in the resulting solution. A suspension of the diazo compound from 16.45 parts of aniline-2-sulphonic acid prepared by diazotising a mixture of the aniline-2-sulphonic acid in 200 parts of water and 18 parts of hydrochloric acid (density 1.18) by means of 6.55 parts of sodium nitrite keeping the temperature between 0° and 2° C. is then added to the resulting solution formed as above. The ensuing procedure involving the gradual addition of sodium carbonate and the addition of salt to the coupling mixture and ultimately of a mixture of sodium dihydrogen phosphate and potassium dihydrogen phosphate dissolved in water after the coupling reaction is completed is the same as described in Example 4. After filtering off the dyestuff the filter cake is mixed with 4 parts of anhydrous disodium hydrogen phosphate and 7.2 parts of anhydrous potassium dihydrogen phosphate and dried at 20 to 40° C. The product dissolves in water and in sulphuric acid to give yellowish red and bluish red solutions respectively and gives yellowish red colourations on cellulosic materials for example cotton when applied thereto by padding with an aqueous solution and after treating the padded material with a brine solution containing caustic soda. The dyestuff, has in the form of its free acid, the formula:

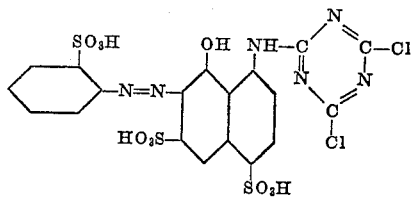

The colourations obtained lose little depth when submitted to severe washing or soda boiling. In place of the 16.45 parts of aniline-2-sulphonic acid used as diazo component in this example the compounds tabulated below may be substituted for it in equivalent amounts and the dyestuffs then obtained give when applied to cellulosic materials colourations having the shades indicated below and very good resistance to severe washing and to soda boiling.

| Diazo component coupled with 1-(dichlorocyanuryl-amino)-8-naphthol-4:6-disulphonic acid | Shade of dyeings on cotton |
|---|---|
| 4-toluidine-3-sulphonic acid | Bluish red. |
| 4-chloroaniline-2-sulphonic acid | Do. |
| 3-aminobenzotrifluoride-4-sulphonic acid | Reddish orange. |

What I claim is:
1. Monoazo dyestuffs which in the form of their free acids are of the formula:

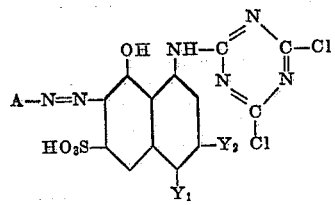

wherein the $Y_1$ and $Y_2$ radicals are such that one of said radicals is hydrogen and the other is selected from the group consisting of hydrogen and —$SO_3H$, and A is a monocyclic aromatic radical free from hydroxyl and amino substitution, one of the positions in said radical A ortho to the —N=N— group being free from halogen substitution and the other position in said radical A ortho to the —N=N— group bearing an —$SO_3H$ group.

2. A monoazo dyestuff which in the form of its free acid, has the formula:

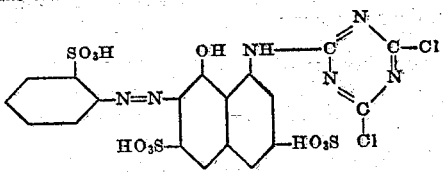

3. A monoazo dyestuff which, in the form of its free acid, has the formula:

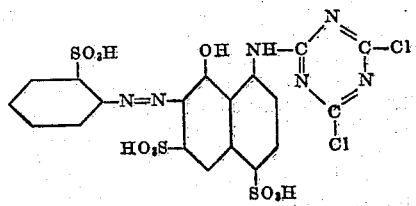

References Cited in the file of this patent
UNITED STATES PATENTS

| 1,667,312 | Fritzsche et al. | Apr. 24, 1928 |
| 1,802,208 | Hoffa et al. | Apr. 21, 1931 |
| 1,886,480 | Haller et al. | Nov. 8, 1932 |
| 2,000,121 | Bush | May 7, 1935 |
| 2,093,424 | Dove | Sept. 21, 1937 |
| 2,339,739 | Blackshaw et al. | Jan. 18, 1944 |
| 2,384,283 | Conrad et al. | Sept. 4, 1945 |
| 2,722,527 | Wehrli et al. | Nov. 1, 1955 |